United States Patent
Beer et al.

[11] Patent Number: 5,820,953
[45] Date of Patent: Oct. 13, 1998

[54] THERMOFORMED PACKAGE WITH INTEGRATED PREDETERMINED BREAKING POINTS, AND A PROCESS FOR THE PRODUCTION THEREOF

[75] Inventors: Ekkehard Beer, Bad Schwalbach; Tobias Rentzsch, Bad Homburg; Alfred Schad, Wiesbaden, all of Germany

[73] Assignee: Hoechst Aktiengesellschaft, Frankfurt am Main, Germany

[21] Appl. No.: 151,781

[22] Filed: Nov. 15, 1993

Related U.S. Application Data

[63] Continuation of Ser. No. 874,163, Apr. 27, 1992, abandoned.

[30] Foreign Application Priority Data

Apr. 26, 1991 [DE] Germany .......................... 41 13 714.0

[51] Int. Cl.$^6$ ....................................................... B32B 1/02
[52] U.S. Cl. ............................ 428/35.7; 428/43; 428/178
[58] Field of Search ............................ 428/43, 35.7, 178; 206/820, 824

[56] References Cited

U.S. PATENT DOCUMENTS 3,909,582  9/1975  Bowen ........................... 219/121 LM
4,562,333  12/1985  Taub ................................. 219/121 LJ

FOREIGN PATENT DOCUMENTS 0357841  3/1990  European Pat. Off. .
0398447  11/1990  European Pat. Off. .
2576836  8/1986  France .

Primary Examiner—Alexander Thomas
Attorney, Agent, or Firm—Foley & Lardner

[57] ABSTRACT

A thermoformed plastic package with integrated predetermined breaking points formed by discrete regions in the plastic matrix at which points the mechanical properties of the plastic have been modified by action of a laser beam.

21 Claims, 5 Drawing Sheets

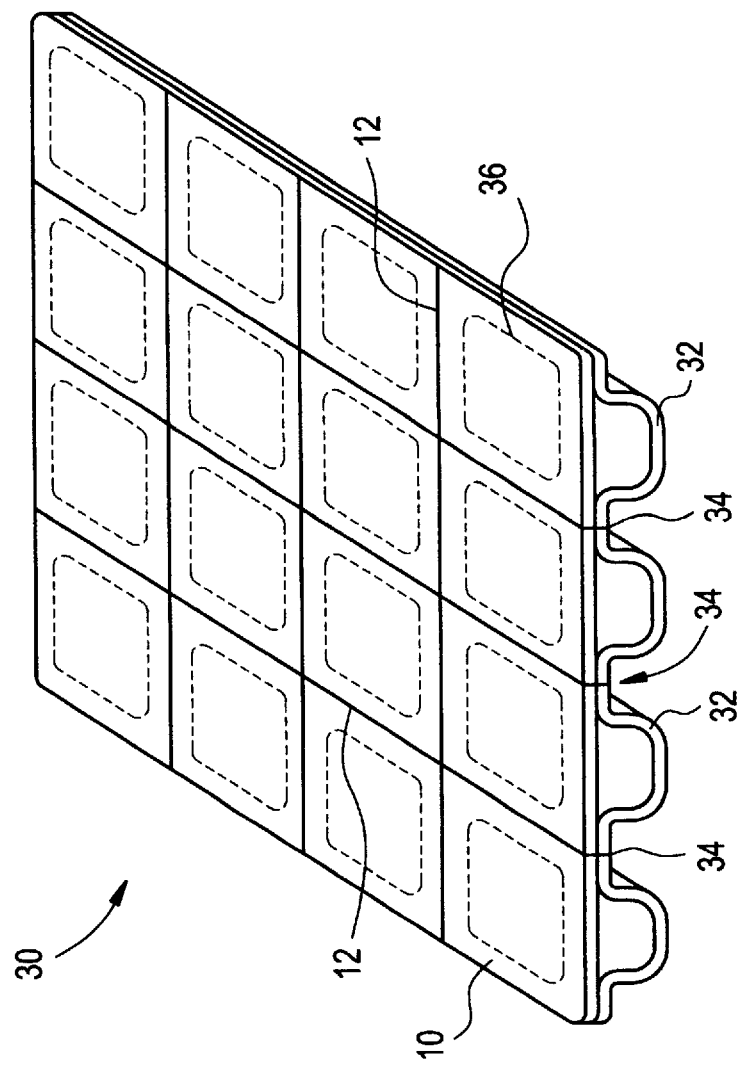

THERMOFORMED PACKAGE WITH INTEGRATED PREDETERMINED BREAKING POINTS, AND A PROCESS FOR THE PRODUCTION THEREOF

This application is a continuation, of application Ser. No. 07/874,163, filed Apr. 27, 1992 abandoned.

BACKGROUND OF THE INVENTION

1. Field of the Invention

The present invention relates to a thermoformed plastic package with integrated predetermined breaking points, and to a process for the production thereof.

2. Description of Prior Art

Over the years, plastics have been increasingly used to package materials of many types. The reason for this is that plastics generally have sufficiently good mechanical strength, which simplifies transport and storage of the packaged materials. In addition, plastics usually provide an excellent barrier against water and water vapor, which effectively prevents the packaged materials from drying out or being contaminated from the outside. A further reason is that the plastics are easily converted into visually attractive presentation forms by shaping and coloring, which enables, in accordance with the desires of the manufacturer, the aesthetic perception of the consumer to be addressed in a particularly pleasant manner and the impression of quality to be given.

In packages made of plastic, a problem generally arises if the package contents are to be turned or poured out of the package by the end user or consumer, but the mechanical strength of the plastic impedes or prevents this. In order to avoid this inconvenience, for example, thermoformed multiple packages made of plastic are usually provided with perforations or punched recesses, i.e., with predetermined breaking points, at which the plastic can be broken apart by applying a small amount of force, after which the packages can then, for example, easily be separated. However, it has repeatedly proven difficult in practice to reliably and effectively provide redetermined breaking points in a mechanical manner in certain types of plastic.

SUMMARY OF THE INVENTION

An object of the present invention is to provide thermoformed multiple packages made of plastic, in particular made of polyolefin, polyester or polystyrene, which form a tight seal and thus effectively screen the packaged material against external damage and protect it against drying out. Another object of the present invention is to provide thermoformed multiple packages made of plastic that have predetermined breaking points at which they can, on the one hand, easily be separated from one another and, on the other hand, can be opened without great difficulty and enable access to the packaged material. Yet another object of the present invention is to provide thermoformed multiple packages made of plastic that can be produced without difficulties on automatic packaging machines.

Another object of the present invention is to provide a process for producing such a packaging material.

To achieve the objects and in accordance with the purpose of the invention, as embodied and broadly described herein, one aspect of the invention comprises a thermoformed plastic package with integrated predetermined breaking points, wherein the predetermined breaking points are formed by discrete regions in the plastic package at which points the mechanical properties of the plastic have been modified by action of a laser beam.

According to another aspect of the present invention, there is disclosed a process for the production of a predetermined breaking point within a plastic matrix, in which the plastic, in particular a plastic film, is introduced into a treatment station and irradiated therein by means of at least one laser beam to form the breaking point. The irradiation may be carried out at individual points and/or along coherent lines extending in the film plane.

Other objects and advantages of the invention may be realized and attained by means of the elements and combinations particularly pointed out in the appended claims.

It is to be understood that both the foregoing general description and the following detailed description are exemplary and explanatory only and are not restrictive of the invention, as claimed.

BRIEF DESCRIPTION OF DRAWINGS

FIG. 7 is a schematic diagram of a cup packaging system having rows of individual break-off cups located adjacent each other and having a plastic foil covering having crossed, linear zones of uniform weakness without interruption.

Figure 1:
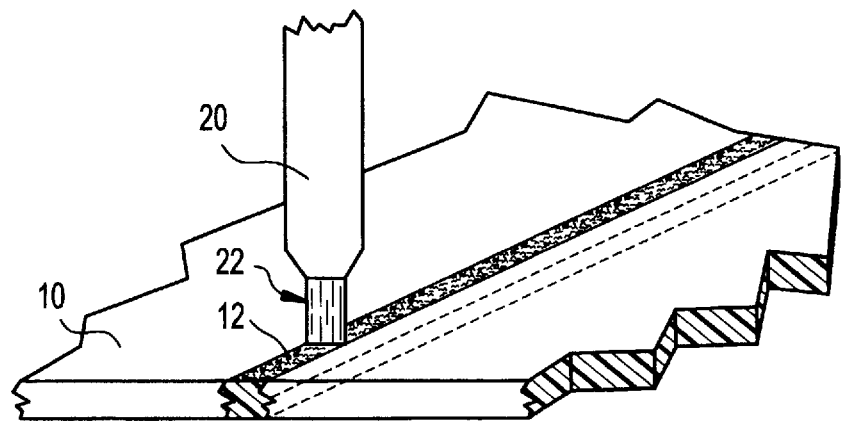
FIG. 1 is a schematic diagram of a plastic material showing a linear zone of uniform weakness without interruption in accordance with the present invention.

The dotted lines in the drawings are for illustration purposes only.

DETAILED DESCRIPTION OF PREFERRED EMBODIMENTS

Any type of plastic may be used according to the present invention. Preferred types of plastics that may be employed are polyolefins, such as polyethylene or polypropylene, polyesters, such as polyethylene terephthalate, polystyrene or substituted polystyrene. These plastics are preferably in the form of films. The films preferably have thicknesses in the range from about 6 to about 1000 $\mu$m, more preferably from about 20 to about 500 $\mu$m. The films may be monolayer or multilayer films. The films may also be stretch-oriented, particularly and preferably biaxially stretch-oriented, in order to improve their mechanical properties.

Discrete regions in the plastic matrix may be point regions which, in each case adjacent to one another, form a coherent predetermined breaking point, but may alternatively be lines extending in the film plane in the form of curves or closed figures. According to the present invention, such lines preferably have a width in the range from about 0.1 to about 10 $\mu$m, in particular from about 0.5 to about 5 $\mu$m.

Laser beams employed in the present invention may, in principle, be laser beams of any type. The laser beams are preferably beams emitted by a $CO_2$ laser. A typical $CO_2$ laser is a pulsed laser, i.e., a discontinuous laser, having a continuous output of about 100 W and a frequency of about 10 KHz. Laser beams of this type cause changes in the mechanical properties of plastic materials which, expressed in simplified terms, may be regarded as a type of embrittlement.

The plastic materials intended for treatment are usually in a state that may be characterized as self-supporting. If a film of this type of plastic material is treated according to the present invention by means of a laser beam, its flexural strength at the point hit by the laser beam is reduced or eliminated entirely. The film then has a tendency at this point to break on flexing or to tear on mechanical load.

The present invention also relates to a process for the production of a plastic matrix having a predetermined breaking point, in which the plastic, preferably one or more films made of one or more types of plastics, is introduced into a treatment station and irradiated therein by means of at least one laser beam of sufficient intensity so as to reduce or eliminate the flexural strength of the plastic at the points of irradiation. The irradiation can take place at individual points or along coherent lines extending in the film plane. The treatment of the plastic matrix according to the present invention is preferably continuous.

The intensity of the laser beam used to irradiate the plastic films depends on the thickness of the plastic films and on the chemical composition of the plastic material(s). The intensity of the laser output is sufficient to be able to carry out all the steps at conventional packaging speeds. An adequate intensity for a film, for example, made of polypropylene and having a thickness of 25 $\mu$m and passed through a treatment station at a speed of 100 mm/s, is about 50 W.

Two thermoformed multiple packages of the type according to the present invention are described in greater detail in illustrative terms below, but the present invention is not intended to be restricted to the embodiments disclosed therein.

A thermoformed multiple package for liquids comprises, for example, a plurality of circular cups arranged alongside one another in a plane, connected to one another via plastic webs and in each case sealed by covering films. Examples of these are cups for yoghurt, jam and the like. The cups are made of amorphous polyester film, in particular polyethylene terephthalate, while the covering films may be heat-sealable polyester films with the heat-sealing layers formed, for example, from a copolyester with terephthalic acid and isophthalic acid units. The excess material can be removed by high-power laser beams, so that only connecting webs between the individual cups remain. In the region of the connecting webs, predetermined breaking points which affect both film layers, the amorphous polyester of the thermoformed pot and the heat-sealable covering film, are produced using laser beams of specifically reduced power. If opening tongues for simplified removal of the covering film from the individual cups are provided, predetermined breaking points which preferably only affect the amorphous polyester of the cups are provided in the region of the opening tongues by means of laser beams of reduced power.

Another package of the type according to the present invention may be a blister package, for example for tablets. An example of a suitable thermoformable base film is an unoriented film of isotactic polypropylene which, after the thermoforming process, has cells arranged alongside one another in the film plane. The cells are sealed by means of a covering film, made preferably of biaxially stretch-oriented, opaque, heat-sealable polypropylene film. The predetermined breaking points can be produced by perforations and/or targeted irradiation of the two plastic layers in the regions between the individual cells by means of laser beams and additionally by cross-shaped or circular irradiation of the covering film in the region of the cells by means of laser beams.

EXAMPLES

Referring to FIG. 1, a plastic film 10 is irradiated with a laser beam 22 from a laser source 20 to form predetermined breaking points 12. In FIG. 1, the predetermined breaking points 12 is embodied as a linear zone of uniform weakness without interruption as produced or formed by modifying the mechanical properties of the plastic film 10 using a laser beam 22.

Figure 2:
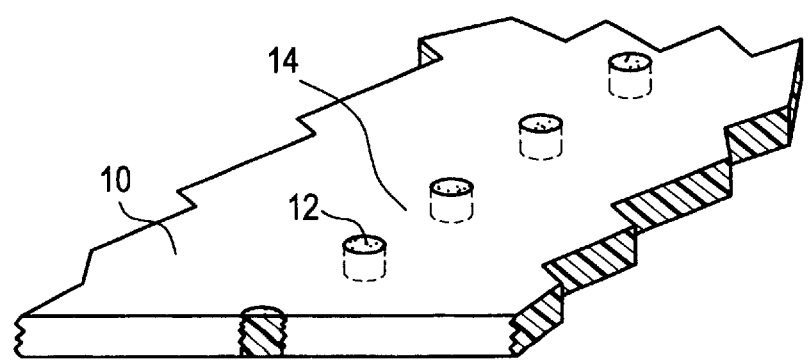
FIG. 2 is a schematic diagram of a plastic material showing a linear zone of uniform weakness with a linear type of interruptions.

Referring to FIG. 2, the predetermined breaking points 12 are embodied in a linear zone of uniform weakness but with interruptions alternating between a point 12 of weakness formed by modifying the mechanical properties of the plastic film 10 using a laser beam 20 and a linear section 14 of plastic film that has not been modified. This pattern of weakened points 12 may be effected by pulsing the laser on and off while the plastic film 10 travels past a laser source 10 as shown in FIG. 1.

Figure 3:
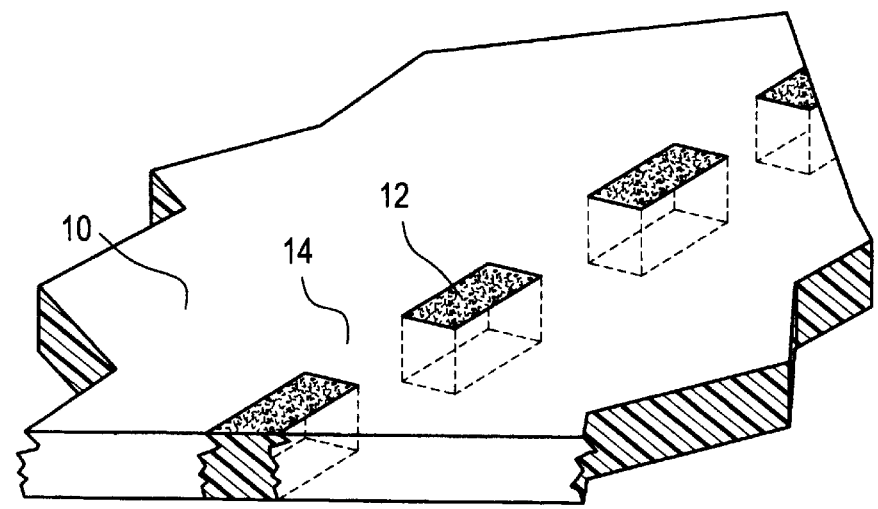
FIG. 3 is a schematic diagram of a plastic material showing a linear zone of uniform weakness with a spot type of interruption.

Referring to FIG. 3, the predetermined breaking points 12 are also embodied in a linear zone of uniform weakness but with an alternate pattern of interruption alternating between a linear section of weakness 12 formed by modifying the mechanical properties of the plastic film 10 and a linear section of plastic film 14 that has not been modified. This pattern of weakened sections 12 may be effected by pulsing the laser on and off in much the same manner as when forming a pattern of weakened points as shown in FIG. 2 but with the on pulse being of a greater time interval while the plastic film 10 and a laser source 10 travel past each other as shown in FIG. 1.

Figure 4:
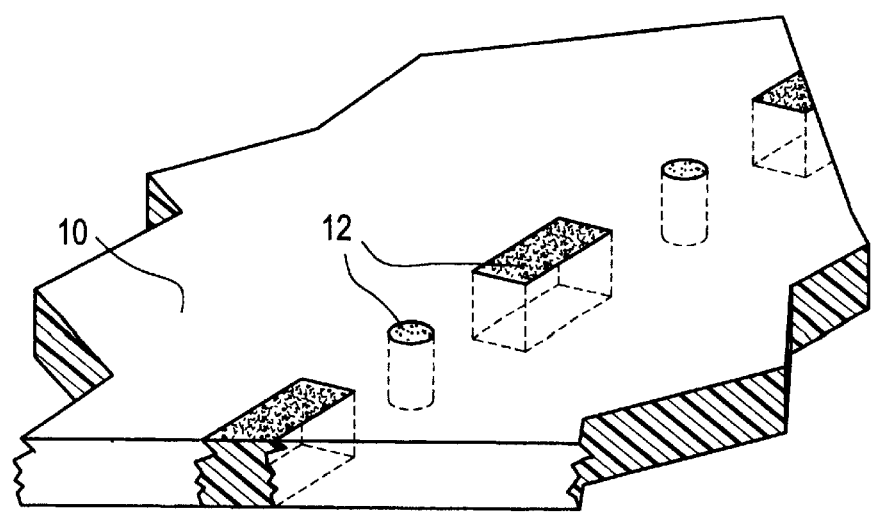
FIG. 4 is a schematic diagram of a plastic material showing a linear zone of uniform weakness with an alternating linear and spot type of interruption.

Referring to FIG. 4, there is shown another pattern of weakness zones on a plastic film 10 that is formed by modifying the plastic film 10 as shown in FIGS. 2 and 3 but in an alternating manner to effect an alternating pattern of weakened points and weakened linear sections.

Figure 5:
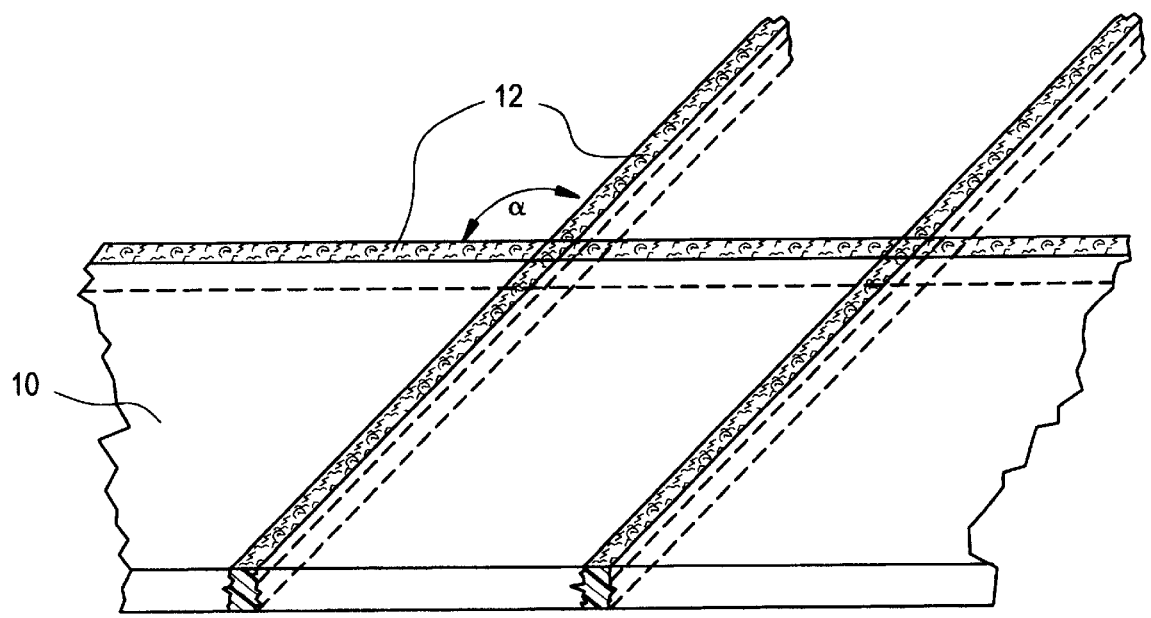
FIG. 5 is a schematic diagram of a plastic material showing crossed, linear zones of uniform weakness without interruption, wherein a represents an angle.

Referring to FIG. 5, a plastic film 10 is irradiated with a laser beam 22 in much the same manner as shown in FIG. 1 to form a cross pattern of predetermined breaking points 12 in the form of crossed linear zones of uniform weakness. The use of this cross pattern of predetermined breaking points becomes evident in multi-container packaging as shown and illustrated in FIGS. 6 and 7. In FIG. 5, the angle α may be executed as a right angle or some other appropriate angle suitable for the container opening.

Figure 6:
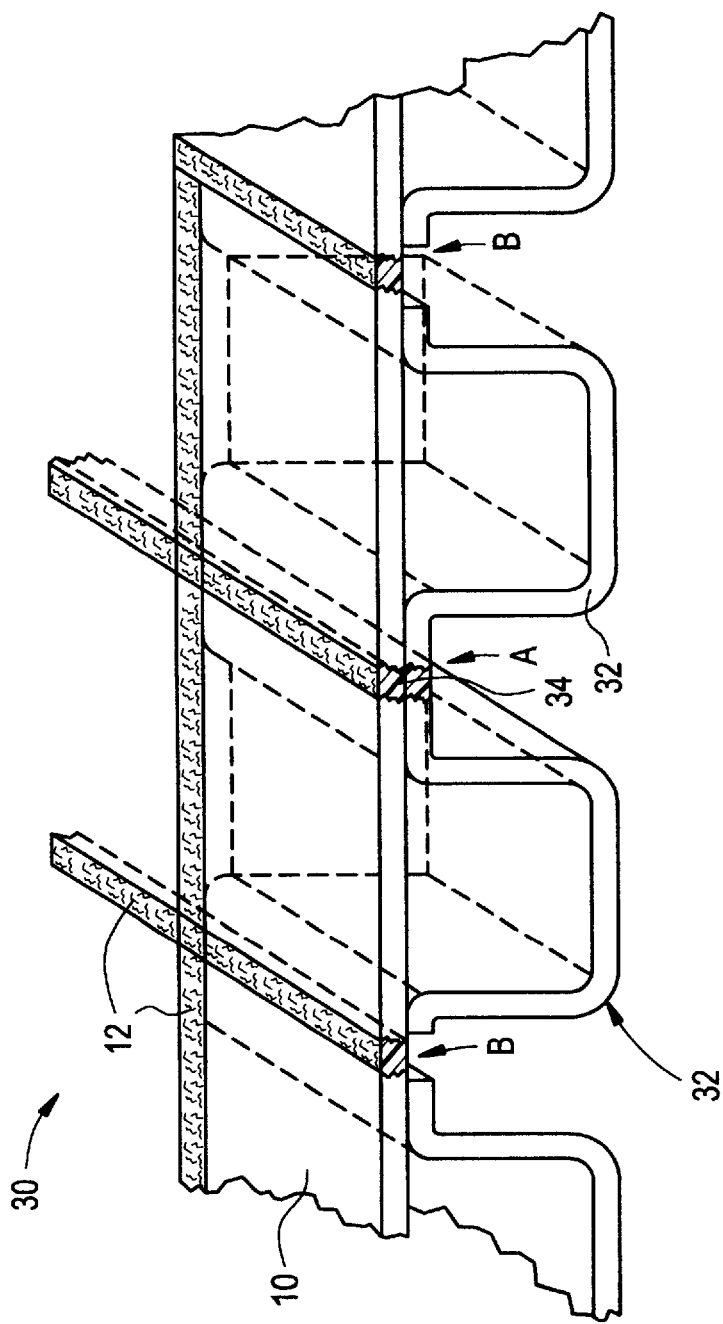
FIG. 6 is schematic diagram of a deep-drawn package system having individual break-off packages and a plastic cover having crossed, linear zones of uniform weakness without interruption.

FIG. 6 illustrates a multi-container break-off package system 30 wherein the break-off containers 32 may be continuous as indicated by arrow A or interrupted or discontinuous as indicated by arrow B. In the case where the container 32 is continuous as indicated by arrow A, the section 34 of the container 32 under the predetermined breaking points 12 of the plastic film 10 may also be weakened by action of the laser beam 22 as shown in FIG. 1.

Referring to FIG. 7, a complete multi-container break-off package system 30 is shown. The predetermined weakened zones 12 may be effected in a manner as shown in FIGS. 1, 2 and/or 3 as well as different variations and designs depending on the size and design of the container 32 openings 36.

It will be apparent to those skilled in the art that various modifications and variations can be made in the thermoformed package of the present invention and in construction of this package without departing from the scope or spirit of the invention. Accordingly, it is intended that the specification and examples be considered as exemplary only, with a true scope and spirit of the invention being indicated by the following claims.

What is claimed is:

1. A thermoformed plastic package having integrated means in discrete regions for decreasing the flexural strength of said plastic package by action of a laser beam causing a chance in the mechanical property of embrittlement in said discrete regions in a manner which does not remove said discrete regions.

2. A package as claimed in claim 1, wherein the plastic is selected from the group consisting of a polyolefin, a polyester, polystyrene, substituted polystyrene, and vinyl chloride based polymers.

3. A package as claimed in claim 2, wherein the polyolefin is selected from the group consisting of polyethylene and polypropylene.

4. A package as claimed in claim 2, wherein the polyester is polyethylene terephthalate.

5. A package as claimed in claim 1, wherein the plastic is in the form of a film having a thickness in a range from about 6 to 1000 microns.

6. A package as claimed in claim 5, wherein the plastic is in the form of a film having a thickness in a range from about 20 to 500 microns.

7. A package as claimed in claim 1, wherein the plastic is made of at least two films placed in overlapping configuration.

8. A package as claimed in claim 7, wherein at least one of the films placed in overlapping configuration is stretch-oriented.

9. A package as claimed in claim 8, wherein at least one of the films placed in overlapping configuration is biaxially stretch-oriented.

10. A package as claimed in claim 1, wherein the discrete regions in the plastic package are lines extending in the film plane in the form of straight lines, curves or closed figures.

11. A package as claimed in claim 1, wherein the laser beams are pulsed $CO_2$ laser beams.

12. A package as claimed in claim 1, comprising a blister package.

13. A thermoformed plastic package having a predetermined zone of embrittlement in discrete regions formed by action of a laser beam causing a change in the mechanical property of embrittlement in said discrete regions of said plastic package in a manner which does not remove said discrete regions.

14. A thermoformed plastic package as claimed in claim 13, wherein the predetermined zone of embrittlement comprises points of embrittlement.

15. A thermoformed plastic package as claimed in claim 13, wherein the predetermined zone of embrittlement comprises a linear, uninterrupted zone of embrittlement.

16. A thermoformed plastic package as claimed in claim 13, wherein the predetermined zone of embrittlement comprises linear, interrupted zones of embrittlement.

17. A thermoformed plastic package as claimed in claim 13, wherein the plastic is selected from the group consisting of a polyolefin, polyester, polystyrene, substituted polystyrene, and vinyl chloride based polymers.

18. A thermoformed plastic package as claimed in claim 13, wherein the plastic is in the form of a film having a thickness in a range from about 20 to 500 microns.

19. A thermoformed plastic package as claimed in claim 13, wherein the plastic is made of at least two films placed in overlapping configuration.

20. A thermoformed plastic package as claimed in claim 13, wherein the laser beam is a pulsed $CO_2$ laser beam.

21. A thermoformed plastic package having integrated means in embrittled discrete regions for decreasing the flexural strength of said plastic package, wherein said embrittled discrete regions are formed at the direct point of contact with a laser beam in a manner which does not remove said discrete regions.

* * * * *